United States Patent
Liu et al.

(10) Patent No.: US 7,596,196 B1
(45) Date of Patent: Sep. 29, 2009

(54) TIMING RECOVERY IN ERROR RECOVERY FOR ITERATIVE DETECTION

(75) Inventors: Jingfeng Liu, Longmont, CO (US);
Rose Shao, Worcester, MA (US);
Jinghuan Chen, Laguna Beach, CA (US)

(73) Assignee: Maxtor Corporation, Longmont, CO (US)

( * ) Notice: Subject to any disclaimer, the term of this patent is extended or adjusted under 35 U.S.C. 154(b) by 549 days.

(21) Appl. No.: 11/528,144

(22) Filed: Sep. 27, 2006

Related U.S. Application Data

(60) Provisional application No. 60/720,991, filed on Sep. 27, 2005.

(51) Int. Cl.
*H04L 7/00* (2006.01)
*H04L 27/06* (2006.01)
(52) U.S. Cl. .................. 375/354; 375/341; 375/355
(58) Field of Classification Search .......... 375/354, 375/355, 371, 373, 375, 376, 316, 322, 324, 375/326, 327, 340, 341, 262, 261, 260, 259; 327/141, 155, 156; 708/290, 200, 100, 313, 708/300; 714/795, 786, 746, 699
See application file for complete search history.

(56) References Cited

U.S. PATENT DOCUMENTS

| 6,101,054 | A  | * | 8/2000 | Tsunoda ................... 360/46 |
| 6,412,088 | B1 |   | 6/2002 | Patapoutian et al. |
| 2003/0030930 | A1 | * | 2/2003 | Sugawara et al. ............. 360/48 |
| 2003/0043487 | A1 | * | 3/2003 | Morita et al. ................. 360/25 |

OTHER PUBLICATIONS

B. Mielczarek, A. Svensson, "Post-decoding Timing Synchronization of Turbo Codes on AWGN Channels", pp. 1265-1270, Chalmers University of Technology, Dept. of Sginals and Systems, Communication Systems Group, 2000 IEEE, Goteborg, Sweden.

* cited by examiner

*Primary Examiner*—Tesfaldet Bocure
*Assistant Examiner*—Vineeta S Panwalkar
(74) *Attorney, Agent, or Firm*—Cesari and McKenna, LLP; Patricia A. Sheehan

(57) ABSTRACT

A decoding system includes a timing loop for use in error recovery mode operations, in which "fast decode" bit values that are used for timing recovery purposes in the normal modes of operation are replaced, at an appropriate iteration in the error recovery mode, with detected bit values from an iterative detector. The replacement occurs after a reread operation in which the timing loop maintains lock.

20 Claims, 4 Drawing Sheets

TIMING RECOVERY IN ERROR RECOVERY FOR ITERATIVE DETECTION

CROSS-REFERENCE TO RELATED APPLICATIONS

The present application claims the benefit of U.S. Provisional Patent Application Ser. No. 60/720,991, which was filed on Sep. 27, 2005, by Jingfeng Liu et al. for a TIMING RECOVERY IN ERROR RECOVERY FOR ITERATIVE DETECTION and is hereby incorporated by reference.

BACKGROUND OF THE INVENTION

1. Field of the Invention

The invention relates generally to decoding systems and, more particularly, to timing loops used in the decoder to control signal sampling.

2. Background Information

Increases in the storage capacities of hard disks or other storage devices result in read signals with smaller signal-to-noise ratios (SNRs). For better detection and decoding results with the lower SNRs, iterative detection and decoding methods, such as majority a posteriori (MAP) detecting and low-density parity check (LDPC) decoding are used to reproduce recorded data. The iterative methods work well at low raw bit error rates, and thus, the accurate operations of timing loops associated with detecting the bits in the read signals are critical. The timing loop controls the times at which the sampling of the data, or read, signal occurs. In the low SNR environment, the sampling rate must be closely matched to the bit rate of the read signal, to ensure that the decoder is decoding data and not noise.

The disk drives may employ a disk lock clock (DLC) that attenuates the phase or frequency error between a sample timing clock and the recorded signal bit rates. Such clocks are described in U.S. Pat. No. 6,738,205 entitled Self-Writing of Servo Patterns in Disk Drives, which is assigned to a common assignee and incorporated herein by reference. Essentially the DLC utilizes preamble or other information recorded on the disk to match the clock rate to the bit rate used for recording. The timing loop then fine tunes the clock signal to correspond to the bit rate in the read signal. Using the DLC, the timing loop operates with a narrow bandwidth and, even in the low SNR environment, runs without exceeding an acceptable loss of lock rate threshold.

There are, however, certain relatively large timing disturbances that cause the narrow bandwidth timing loop to lose lock at a rate that is unacceptable. Examples of the timing disturbances are phase steps, phase humps, and sinusoidal disturbances. When such a timing disturbance occurs, the system increases the bandwidth of the timing loop, in an attempt to maintain lock to the read signal bit rate. However, in the low SNR environment, the increase in bandwidth and the resulting increase in the noise included in the decoding operations may result ultimately in the failure of the timing loop, and thus, in a failure to properly decode the data.

Various techniques are currently used in an attempt to recover data after an unsuccessful decoding operation. One error recovery technique involves rereading the data block from the hard disk and performing a full detecting and decoding operation using the new read signal. If the first rereading and decoding iteration does not result in a data block that contains a correctable number of errors, the system may reread and decode the block a number of times. In certain drives, attempts are made to improve the SNR in the reread signals by reducing the adverse effects of non-repeatable noise through what is referred to as "ADC sample averaging." This technique is discussed in U.S. Pat. No. 6,412,088 entitled Method and Apparatus For Using Block Reread, which is assigned to a common assignee and incorporated herein by reference in its entirety.

The ADC sample averaging works well in most error recovery mode operations. However, in operations that involve large timing disturbances, the rereading of the sector is performed with the wider bandwidth timing loop, and the ADC sampling may often occur when the timing loop is operating with a loss of lock. Accordingly, the samples obtained from these rereadings may, if they are included in the averaging, actually add further noise into the error recovery mode operations. Indeed, incorporating these samples may significantly increase the timing jitter of the timing loop.

Accordingly, what is needed is a mechanism that reduces the timing jitter of the wide bandwidth timing loop over multiple rereads of the sector during error recovery mode operations associated with large timing disturbances.

SUMMARY OF THE INVENTION

The invention is a decoding system that includes an improved timing loop for use in error recovery mode operations, in which "fast decode" bit values that are used for timing recovery purposes in the normal modes of operation are replaced, at an appropriate iteration in the error recovery mode, with detected bit values from an iterative detector. The replacement occurs after a reread operation in which the timing loop maintains lock. The iteratively decoded bit values, which are associated with the decoding of the entire data block, are associated with a lower raw bit error rate than the fast decode bit values. Accordingly, the timing loop is able to more closely track the bit rate of the read signal and the decoder then operates with more accurate signal values.

More specifically, the decoder includes a loss of lock detector, which in the embodiment described below determines the running average of the soft output of an iterative detector that operates over the entire data block. The system detects a loss of lock if the running average falls below a predetermined threshold. The loss of lock indicates that the associated bit values produced by the iterative detector are particularly unreliable. Accordingly, the bit values are not used for timing recovery in a next reread and decode operation. If, however, there is more confidence in the results produced by the iterative detector, i.e., there is no loss of lock, the system uses the bit values produced by the iterative detector for timing recovery in the next reread and decode operation.

The loss of lock detector may, but need not, operate in conjunction with ADC sample averaging, such that the system omits from the averaging the samples for which a loss of lock is detected. Accordingly, the averaging operates only on those rereads that presumably will aid in reducing non-repeatable noise in the read signal.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
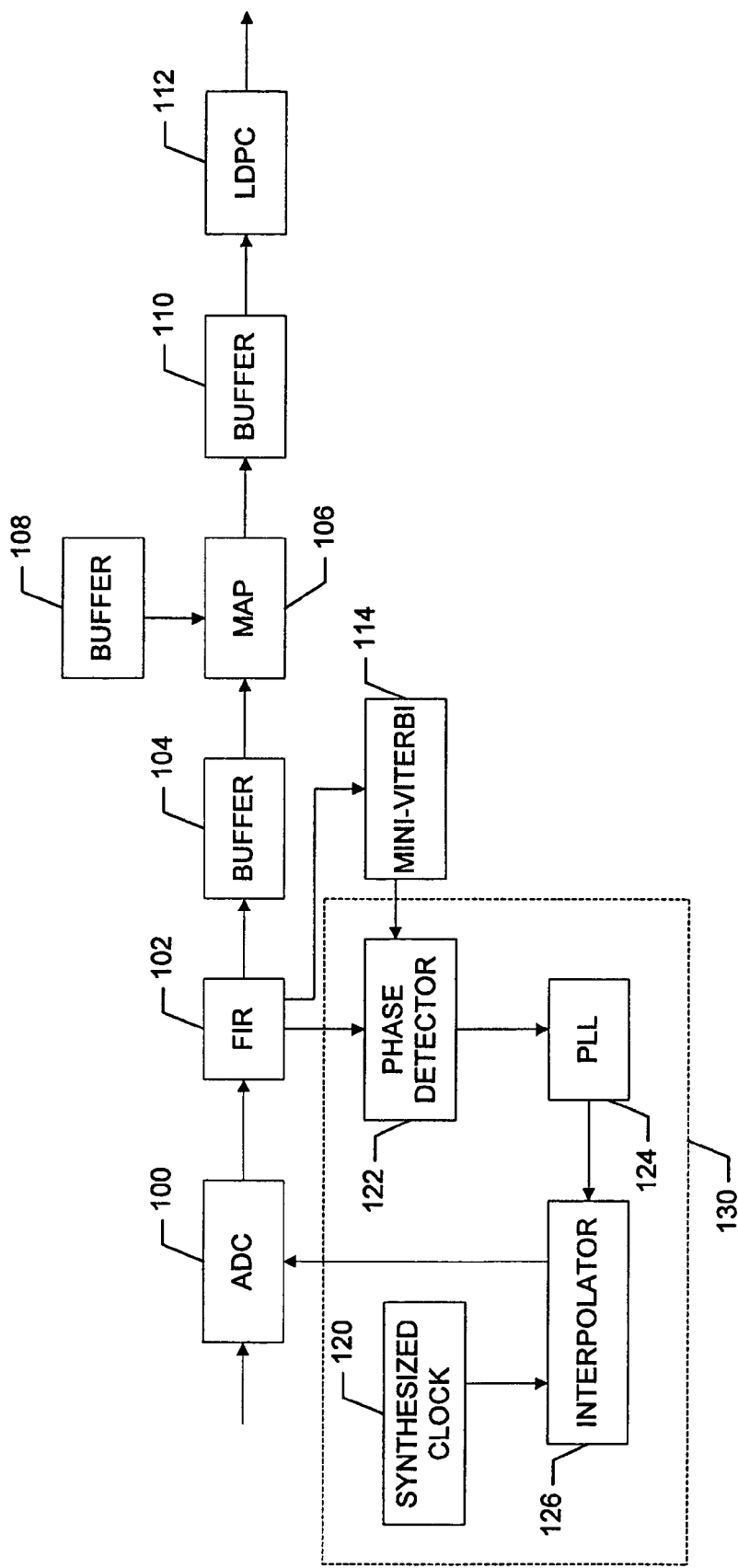
FIG. 1 is a functional block diagram of a prior art decoding system.

Referring now to FIG. 1, an analog read signal associated with reading a sector of a hard drive (not shown) is supplied to an analog-to-digital converter (ADC) 100. The ADC, which may be a flash ADC, operates in a known manner to sample the analog data signal and convert the samples to digital values. The ADC takes samples of the analog signal at times directed by a clock signal that is produced by a timing sub-system 130. The timing sub-system is described in more detail below.

The digitized samples produced by the ADC 10 are supplied to a finite impulse response filter (FIR) 102, which essentially shapes the samples for more reliable bit detection. The filtered data signal is supplied through a buffer 104 to a maximum a posteriori (MAP) detector 106. The MAP detector operates in a known manner to assign estimated bit values to the samples. The MAP detector produces input symbols, which consist of a bit value, or sign, and associated confidence information, and supplies the input signals through a buffer 110 to a low density parity check (LDPC) decoder 112. The LDPC decoder operates in a known manner to iteratively decode the data.

As part of the decoding process, the LDPC decoder 112 provides updated estimates of the bit values and associated confidence information through a buffer 108 to the MAP detector 106. The MAP detector manipulates the updated estimates and associated confidence information and provides updated soft information, through the buffer 104, to the LDPC decoder. The LDPC decoder then decodes the updated soft information and, if convergence does not occur, provides updated estimates of the bit values and associated confidence information to the MAP detector, and so forth, until convergence or a stop condition, such as the end of the allotted decoding time, is reached. The MAP detector and the LDPC decoder operate separately and together in known manners.

The filtered data signal produced by the FIR filter 102 is also provided to a "mini-Viterbi" detector 114. The mini-Viterbi detector operates in a known manner to provide "fast decoded" data that is used for clock synchronization purposes. The mini-Viterbi detector utilizes samples from small segments of the data signal to produce associated fast decode bit values. The fast decode bit values are used by the timing sub-system, to produce adjusted clocking signals for the ADC 100.

The timing sub-system 130 includes a phase detector 122 and a phase locked loop (PLL) 124 that operate together to produce a phase error signal that ultimately drives the phase of the adjusted clocking signal to match the bit rate in the read signal. The phase detector and the PLL operate in conjunction to determine the phase error between the ADC sampling rate and the bit rate of the read signal. The phase detector and the PLL operate both separately and together in known manners.

The phase error signal produced by the PLL 124 is supplied to an interpolator 126. The interpolator also receives a signal from a synthesized clock 120, which in the example is a "disk locked clock," also commonly referred to as a "DLC." The synthesized clock operates in a known manner to provide a clock signal that is timed to the bit rate of the recorded signal. The interpolator essentially adjusts the timing of the clock signal that is produced by the synthesized clock, to fine tune the signal to the bit rate in the read signal, and thus, reduce the phase error detected by the phase detector and the PLL. The interpolator provides the adjusted clocking signal to the ADC, to control the timing of the sampling of the analog read signal. The interpolator and the synthesized clock operate both separately and together in known manners.

The system, as described above, operates well with a narrow bandwidth timing loop. Under normal operating conditions, the narrow-bandwidth timing loop operates with an acceptably low loss of lock rate, even in low SNR environments. The system, however, does not operate well when a large timing disturbance occurs, such as, a phase step, a phase hump, or a sinusoidal disturbance. In these circumstances, a wider bandwidth is required in the timing loop in order to track the read signal bit rate. The wider bandwidth, however, introduces more noise into the detection operations, and the timing loop may ultimately fail. Fortunately, the large timing disturbances are relatively rare, such that the system can handle the associated timing jitter reduction operation in error recovery mode.

Figure 2:
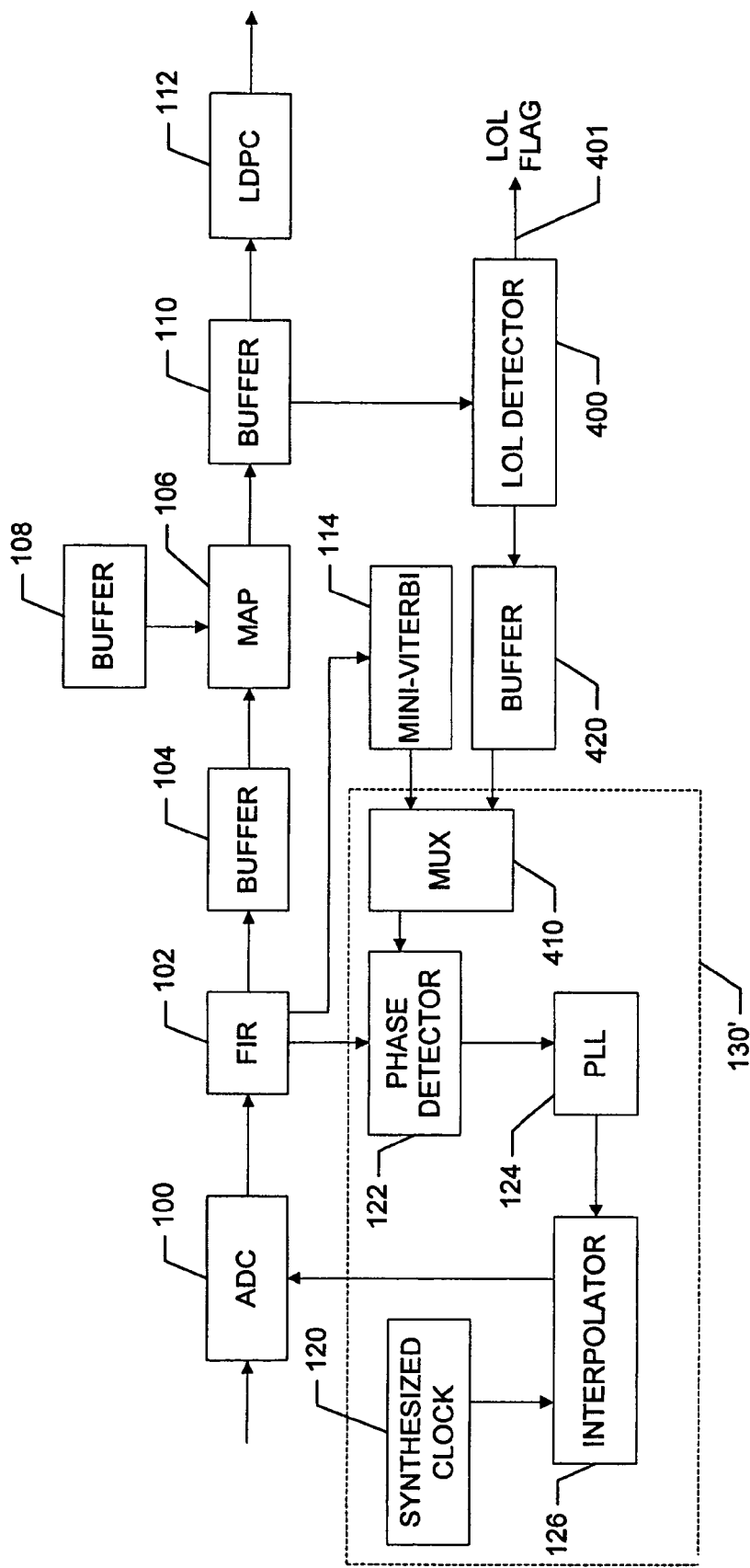
FIG. 2 is a functional block diagram of a decoding system constructed in accordance with the invention.
Figure 3:
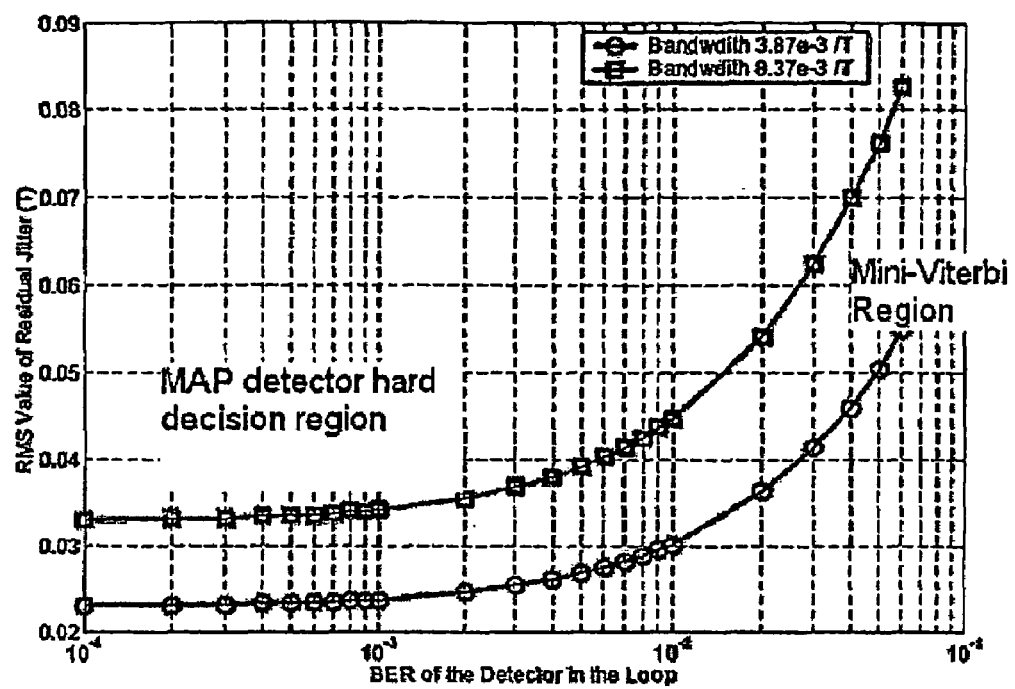
FIG. 3 is a chart illustrating timing loop jitter versus detected bit value information.

Referring now to FIG. 2, the timing jitter reduction operation in error recovery mode operates a timing sub-system that, at appropriate times, utilizes for timing recovery the bit values detected by the MAP detector 106 rather than the bit values detected by the mini-Viterbi detector 114. The raw bit error rate associated with the output from the MAP detector is much lower than the raw bit error rate associated with the output from the mini-Viterbi detector, and the jitter of the timing loop is thus significantly reduced. The chart in FIG. 3 illustrates measured differences in timing loop jitter using the bit values produced by the mini-Viterbi detecting and the MAP, or iterative detecting.

The timing jitter reduction operation in error recovery mode starts by increasing the bandwidth of the timing loop in the timing sub-system 130'. As discussed above, the included timing loop is thus more likely to lose lock in the low SNR environment. A loss of lock detector 400 is included in the system, essentially to prevent the system from utilizing, in the timing recovery for a next read operation, bit values that are detected when the timing loop has lost lock, that is, bit values that are more likely to be associated with signal noise.

Figure 4:
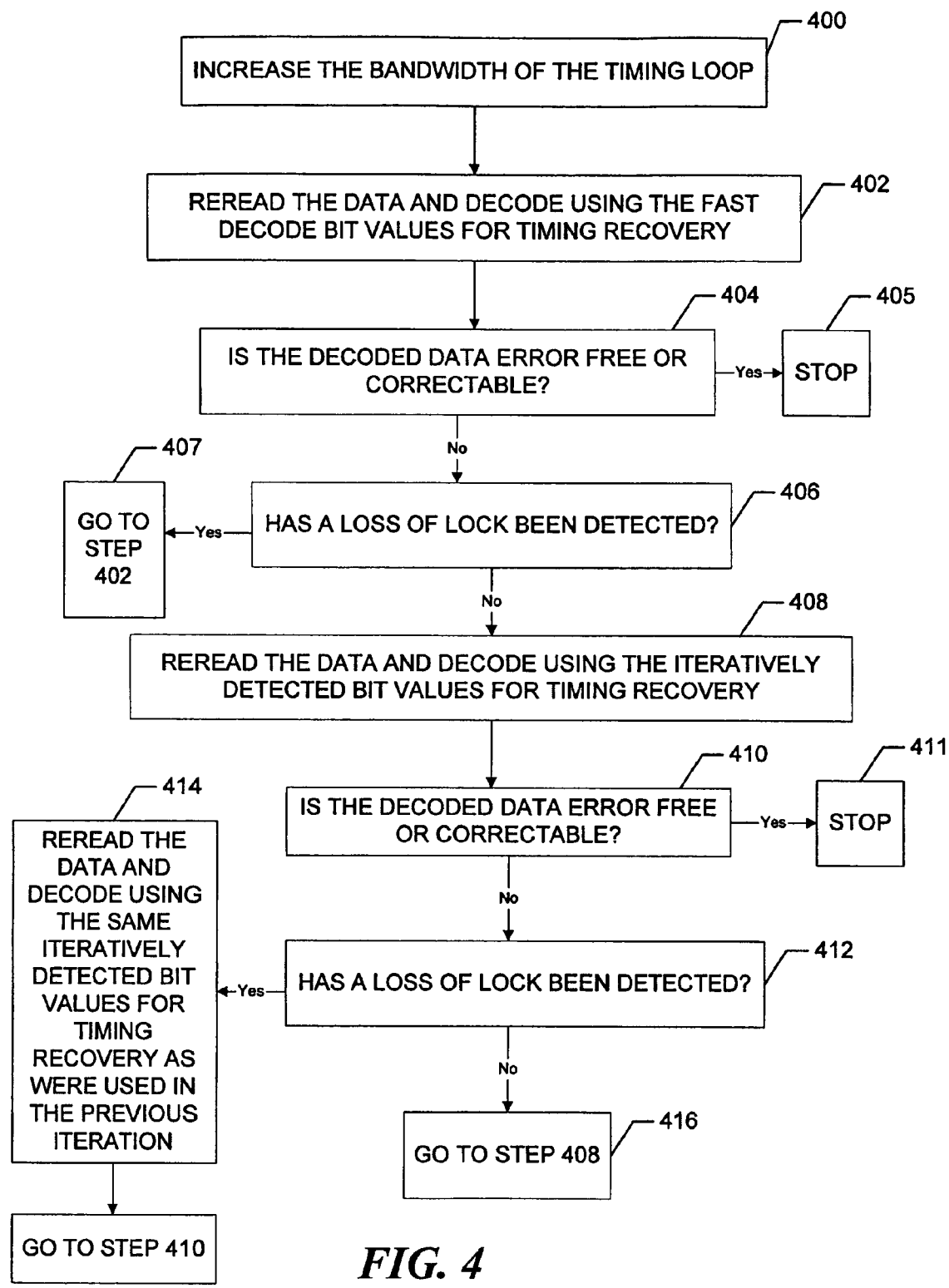
FIG. 4 is a flow chart of the operations of the system of FIG. 2.

Referring still to FIG. 2 and also to FIG. 4, the system operates in the timing jitter reduction error recovery mode when normal data detecting and decoding operations produce a data block that contains an uncorrectable number of errors. The system first rereads the block and tries to detect and decode the data with the timing loop set to use a relatively wide bandwidth. (Steps 400, 402). The bit values produced by the mini-Viterbi detector 114 are supplied to the timing sub-system 130' through a multiplexer (MUX) 410. The phase detector 122 and the PLL 124 utilize the supplied bit values to produce phase error information that corresponds to the phase difference between the sampling rate and the read signal bit rate. The PLL supplies the phase error information to the interpolator 126, which adjusts the clock signal provided by the, synthesized clock 120 to produce the adjusted clocking signal that drives the sampling operations of the ADC 100. The ADC 100, the FIR 102, the MAP detector 106, and the LDPC decoder 112 all operate as described above to detect and decode the data. If the operation produces a data block that is error-free or contains a correctable number of errors, the error recovery mode operation ends. (Step 405). Otherwise, the error recovery operation continues.

The loss of lock detector 400, which in the example calculates a moving average of the soft information produced by the MAP detector 106, detects a loss of lock if the moving average falls below a predetermined threshold. (Step 406). The loss of lock indicates that there is little confidence in the accuracy of the bit values produced by the MAP detector, and these values are thus not used for timing recovery purposes in a next error recovery mode iteration. Accordingly, if a loss of lock is detected, the system omits the MAP bit values from the next error recovery mode iteration. As described below, the system, as appropriate, also omits the corresponding sampled signal information from the ADC sample averaging when a loss of lock is detected.

The system starts a second error recovery mode iteration by again rereading the data from the disk sector. If a loss of lock has been detected in the first error recovery mode iteration, the system continues to provide the output produced by the mini-Viterbi detector 114 to the timing loop 120 for this next iteration. (Step 407). Thus in response to a loss of lock flag on line 401 a mux 410 passes the values produced by the mini-Viterbi to the phase detector 122.

If a loss of lock has not been detected in the first error recovery mode iteration, the system instead provides the hard decision output produced by the MAP detector 106 to the timing sub-system for the next iteration. (Step 408). Thus, the bit values produced by the MAP detector are supplied to a buffer 420 and the MUX 410, in turn, provides the contents of the buffer 420 to the timing loop. Operating under the control of a controller (not shown) the system, at any given time, sends to the timing sub-system the detected bit values that correspond to the portion of the read signal then being sampled. As discussed above with reference to FIG. 3, the raw bit error rate associated with the bit values produced by the MAP detector is significantly lower than the rate associated with the hard decisions of the mini-Viterbi detector 114, and the timing loop jitter is thus significantly reduced.

The system may instead use the hard decisions produced by the LDPC decoder in the timing recovery, if the LDPC decisions for the entire block are available. In which case, the hard decision data from the buffer 108 are supplied to the buffer 420.

If the block contains an uncorrectable number of errors after the second error recovery mode iteration and the loss of lock flag has not been asserted, the system updates the contents of the buffer 420 with the new bit values produced by the MAP detector 106 or the LDPC decoder 112, as appropriate, and a next error recovery mode iteration is performed. (Steps 410, 412, 416). If the loss of lock flag is asserted, however, the system does not update the contents of the buffer 420, and the system performs a next iteration using the bit values produced in the previous error recovery mode iteration for timing recovery. (Step 414). The system thus uses the best estimated bit values then available for the timing recovery. The system keeps performing error recovery mode iterations in this manner until the data block is reproduced with a correctable number of errors or a stop condition occurs. (Steps 415, 416).

The multiple rereads performed by the system may also contribute to ADC sample averaging, as described above. If the loss of lock flag is not asserted for a given reread, the corresponding sample information is included in the averaging. If the loss of lock flag is asserted, however, the system does not include the corresponding sample information in the ADC sample averaging. The system thus refrains from introducing further noise into the averaging. If the ADC averaging is performed, the corresponding information is used in timing recovery operations in the known manner.

The foregoing description has been limited to a specific embodiment of this invention. It will be apparent, however, that variations and modifications may be made to the invention, with the attainment of some or all of its advantages. For example, the loss of lock detector 400 is described as calculating a moving average of the soft information produced by the MAP detector 106. The loss of lock detector may instead calculate the moving average of the soft information produced by the LDPC decoder 112. Alternatively, the loss of lock detector may detect loss of lock using the phase error signals produced by the PLL 124, or the signals produced by the interpolator 126, or by analysis of other signals produced by the system. The iterative detector is described as a MAP detector and may instead be another type of detector that produces bit values that correspond to the decoding of the entire data block. The decoder is described as an LDPC decoder but may instead be any type of iterative decoder. The fast decode detector is described as a mini-Viterbi detector but may instead be any other type of detector that produces bit values associated with the manipulation of portions of the data block. Therefore, it is the object of the appended claims to cover all such variations and modifications as come within the true spirit and scope of the invention.

What is claimed is:

1. A timing recovery system for use in data block error recovery operations, the system including:
    an analog-to-digital converter that produces digital values associated with samples of an analog signal that corresponds to the data block;
    a fast detector that produces first bit values that correspond to the digital values by decoding respective portions of the sampled signal;
    an iterative detector that produces second bits values that correspond to the digital values by iteratively decoding the entire data block;
    a timing sub-system for producing a clocking signal that sets a sampling rate for the analog-to-digital converter, the timing sub-system producing the clocking signal based in part on detected phase errors between a bit rate of the signal and the sampling rate, the timing sub-system operating during error recovery rereads to
        determine the phase error based on the digital values and the corresponding first bit values, or
        determine the phase error based on the digital values and the corresponding second bit values;
    a loss of lock detector that determines for each decoding of the data block if a loss of lock has occurred in the timing sub-system, and
    a controller for providing the first and second bit values to the timing sub-system, the controller providing the second bit values after an error recovery reread occurs without a loss of lock.

2. The timing recovery system of claim 1 wherein the controller further updates the second bit values provided to the timing sub-system after error recovery rereads that occur without a loss of lock.

3. The timing recovery system of claim 1 wherein the iterative detector is a maximum a posteriori (MAP) detector.

4. The timing recovery system of claim 1 wherein the fast detector is a Viterbi detector.

5. The timing recovery system of claim 3 wherein the loss of lock detector determines a running average of soft information produced by the MAP detector, the loss of lock detector detecting a loss of lock when the running average falls below a predetermined threshold.

6. The timing recovery system of claim 1 wherein the timing loop includes a phase locked loop and an interpolator, the interpolator adjusting the clock signal to reduce the phase error signal produced by the phase locked loop.

7. A method of performing error recovery operations to recover a data block, the method including the steps of:
    A. re-reading a sector of data to produce a read signal and decoding the read signal based on signal samples that are produced in accordance with timing signals that are based on fast decode bit values that are produced by decoding respective portions of the data block;
    B. determining if the data block decoded in step A contains a correctable number of errors and if so ending the error recovery operation;
    C. if a next re-read operation is required, determining if a loss of lock occurred in a timing loop and if so repeating steps A-C until the block is correctly decoded or a stop condition occurs,
    D. if a no loss of lock is determined to have occurred in step C rereading the sector and decoding the read signal based on signal samples that are produced in accordance with timing signals that are based on iteratively detected bit values that are produced by decoding the entire data block;

E. determining if the data block decoded in step D contains a correctable number of errors and if so ending the error recovery operation;
F. if a next reread operation is required and no loss of lock occurred in step D, repeating steps D-F until the data block is recovered or a stop condition occurs;
G. if a next reread operation is required and a loss of lock occurred in step D, rereading the sector and decoding the read signal based on signal samples that are produced in accordance with timing signals that are based on the iteratively detected bit values used in the previous reread and decoding step;
H. determining if the data block decoded in step G contains a correctable number of errors and if so ending the error recovery operation;
I. if a next reread operation is required and no loss of lock occurred in step G, repeating steps D-H until the data block is recovered or a stop condition occurs.

8. The method of claim 7 wherein the respective steps of detecting loss of lock include
calculating a running average of soft information produced while iteratively decoding the bit values, and
detecting the loss of lock if the running average falls below a predetermined threshold.

9. A decoding system for decoding a block of data, the system including
an analog-to-digital converter that samples an analog signal that corresponds to the data block and produces digital values that correspond to the respective samples;
a fast detector that produces first bit values that correspond to the digital values by decoding respective portions of the sampled signal;
an iterative detector that produces second bits values that correspond to the digital values by iteratively decoding the entire data block;
an iterative decoder that receives the second bit values and produces corresponding hard decision bit values;
a clock for generating a clock signal;
a timing sub-system for producing an adjusted clock signal to drive the analog-to-digital converter, the timing sub-system adjusting the clock signal based on detected phase errors between a bit rate in the signal and the rate of sampling, the timing subsystem operating in a first mode by detecting phase errors between the first bit values and the corresponding digital values and in a second mode by detecting phase errors between the second bit values and the corresponding digital values;
a loss of lock detector that detects loss of lock in the timing sub-system during a decoding of the data block, and
a controller for providing the first bit values to the timing sub-system during block decoding operations and error recovery operations and the second bit values to the timing sub-system during an error recovery re-read operation that follows an error recovery re-read operation in which no loss of lock was detected.

10. The decoding system of claim 9, wherein the fast detector is a Viterbi detector.

11. The decoding system of claim 9, wherein the iterative detector is a maximum a posteriori (MAP) detector.

12. The decoding system of claim 9, wherein the iterative decoder is a low density parity check (LDPC) decoder.

13. The decoding system of claim 9 wherein the analog-to-digital converter further includes an ADC sample averaging processor that combines signal sample information from rereads of the data to produce the digital values.

14. The decoding system of claim 11 wherein the loss of lock detector determines a running average of soft information produced by the MAP detector, the loss of lock detector detecting a loss of lock when the running average falls below a predetermined threshold.

15. The decoding system of claim 12 wherein the loss of lock detector determines a running average of soft information produced by the LDPC decoder, the loss of lock detector detecting a loss of lock when the running average falls below a predetermined threshold.

16. A timing recovery system for use in error recovery operations of a data block decoder, the system including
a fast detector that produces first bit values by decoding respective portions of the data block;
an iterative detector that produces second bits values by iteratively decoding the entire data block;
a loss of lock detector that detects a loss of lock in a timing loop; and
a timing sub-system for producing a timing signal, the timing sub-system producing the timing signal based on the first bit values in a first mode and based on the second bit values in a second mode, the timing sub-system operating in the second mode after an error recovery re-read operation in which no loss of lock is detected.

17. The timing recovery system of claim 16 wherein
the iterative detector further produces confidence information, and
the loss of lock detector detects a loss of lock when a running average of the confidence information falls below a predetermined threshold.

18. The timing recovery system of claim 16 further including
an iterative decoder that decodes the data block based on the second values and produces hard decision data and associated confidence information, and
the loss of lock detector detects a loss of lock when a running average of the confidence information falls below a predetermined threshold.

19. The timing recovery system of claim 16 further including
an analog-to-digital converter for sampling a data signal that corresponds to the data block and producing digital values,
the fast detector producing the first values based on the digital values;
the iterative detector producing the second values based on the digital values; and
the timing sub-system providing the timing signal to the analog-to-digital converter to drive the converter.

20. The timing recovery system of claim 19 wherein the timing sub-system further includes a phase lock loop that produces an error signal that corresponds to a difference between phases of the timing signal and bits in the data signal, where the phases are based on the digital values and either the first bit values or the second bit values.

* * * * *